United States Patent
Kim et al.

(10) Patent No.: US 7,841,749 B2
(45) Date of Patent: Nov. 30, 2010

(54) OPTICAL MEMBER, BACKLIGHT ASSEMBLY HAVING THE SAME AND LIQUID CRYSTAL DISPLAY DEVICE HAVING THE SAME

(75) Inventors: Jin-Soo Kim, Seoul (KR); Jung-Wook Paek, Suwon-si (KR); Byung-Yun Joo, Goyang-si (KR); Ju-Hwa Ha, Seoul (KR); Jin-Sung Choi, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 142 days.

(21) Appl. No.: 11/408,636

(22) Filed: Apr. 21, 2006

(65) Prior Publication Data
US 2006/0279953 A1   Dec. 14, 2006

(30) Foreign Application Priority Data
Jun. 9, 2005   (KR) .................. 10-2005-0049335

(51) Int. Cl.
*F21V 5/00* (2006.01)

(52) U.S. Cl. .................. 362/332; 362/336; 362/337; 349/57; 349/62; 349/63; 349/64; 359/638; 359/640; 359/831; 359/834

(58) Field of Classification Search .................. 362/27, 362/240, 332, 336, 337, 609, 615, 617–620, 362/626–628, 800; 349/57, 62–64; 359/638, 359/640, 831, 834
See application file for complete search history.

(56) References Cited

U.S. PATENT DOCUMENTS

| | | | | |
|---|---|---|---|---|
| 3,988,609 | A * | 10/1976 | Lewin | 362/296.1 |
| 6,811,274 | B2 * | 11/2004 | Olczak | 362/606 |
| 7,623,293 | B2 * | 11/2009 | Yao et al. | 359/619 |
| 2004/0080938 | A1 * | 4/2004 | Holman et al. | 362/231 |
| 2005/0190575 | A1 * | 9/2005 | Hayakawa | 362/615 |
| 2006/0146571 | A1 * | 7/2006 | Whitney | 362/615 |
| 2007/0035940 | A1 * | 2/2007 | Yao et al. | 362/29 |

FOREIGN PATENT DOCUMENTS

| | | | |
|---|---|---|---|
| CN | 1296570 A | 5/2001 |
| CN | 1336559 A | 2/2002 |
| CN | 1520529 A | 8/2004 |
| CN | 1869737 A | 11/2006 |

* cited by examiner

*Primary Examiner*—Sandra L O'Shea
*Assistant Examiner*—Mary Zettl
(74) *Attorney, Agent, or Firm*—Cantor Colburn LLP (57) ABSTRACT

A backlight assembly includes a light source and an optical member disposed over the light source and including a surface that has a plurality of lens-shaped portions and at least one prism-shaped portion.

23 Claims, 8 Drawing Sheets

OPTICAL MEMBER, BACKLIGHT ASSEMBLY HAVING THE SAME AND LIQUID CRYSTAL DISPLAY DEVICE HAVING THE SAME

CROSS-REFERENCE TO RELATED APPLICATIONS

This application claims priority to Korean Patent Application No. 2005-49335 filed on Jun. 9, 2005, and all the benefits accruing therefrom under 35 U.S.C. §119, the contents of which are herein incorporated by reference in their entirety.

BACKGROUND OF THE INVENTION

1. Field of the Invention

The present invention relates to an optical member, a backlight assembly having the optical member and a liquid crystal display device having the optical member. More particularly, the present invention relates to an optical member capable of increasing luminance and decreasing a thickness, a backlight assembly having the optical member and a liquid crystal display device having the optical member.

2. Description of the Related Art

Generally, a liquid crystal display (LCD) device displays images using liquid crystal having optical and electrical characteristics such as an anisotropic refractive index, an anisotropic permittivity, etc. The LCD device has various advantages such as thin thickness, lightweight structure, low driving voltage and low power consumption, compared with a cathode ray tube (CRT) type display device, plasma display panel (PDP) device, etc. Thus, the LCD device has been widely used in various industrial fields.

The LCD device includes an LCD panel that displays images The LCD panel does not generate light. Thus, the LCD device requires a backlight assembly that provides light to the LCD panel.

Most of conventional backlight assemblies usually employ a cold cathode fluorescent lamp (CCFL) having a thin and long cylindrical shape as a light source. However, a quantity of such CCFLs employed in the LCD device increases as a size of the LCD device increases. Thus, manufacturing cost of the LCD device increases, and optical characteristics of the LCD device such as luminance uniformity are lowered.

A flat-type fluorescent lamp that emits light in a surface shape has been developed in order to overcome the above-mentioned problems. The flat-type fluorescent lamp includes a lamp body divided into a plurality of discharge spaces so as to uniformly generate light in a broad area. The flat-type fluorescent lamp generates a plasma discharge in the discharge spaces in response to a discharge voltage provided from an inverter. A fluorescent layer inside the lamp body is excited in response to ultraviolet light that is generated by the plasma discharge of the discharge spaces to emit the visual light.

Since the flat-type fluorescent lamp includes the lamp body divided into the discharge spaces so as to effectively generate light, a dark line is observed between adjacent discharge spaces in which light is not generated. The conventional backlight assembly includes a light-diffusing plate so as to remove the dark line and improve luminance uniformity. The light-diffusing plate is spaced apart from a light-exiting face of the flat-type fluorescent lamp by a predetermined distance, for example, no less than about 12 millimeters (mm). However, when the light-diffusing plate having a relatively large thickness is disposed relatively far away from the flat-type fluorescent lamp, light loss increases and an overall thickness of the backlight assembly increases.

BRIEF SUMMARY OF THE INVENTION

One exemplary embodiment of the present invention provides an optical member capable of improving luminance and luminance uniformity and decreasing a thickness.

Another exemplary embodiment of the present invention provides a backlight assembly having the above-mentioned optical member.

Another exemplary embodiment of the present invention also provides a liquid crystal display device having the above-mentioned backlight assembly.

In one exemplary embodiment, an optical member includes a surface having a plurality of lens-shaped portions and at least one prism-shaped portion. A ratio of the prism-shaped portion and the lens-shaped portions may be in a range of about 1:1 to about 1:9. The ratio of the prism-shaped portion and the lens-shaped portions may be in a range of about 1:1.5 to about 1:2.5.

Each of the lens-shaped portions may have a pitch of about 50 μm to about 300 μm, and the prism-shaped portion may have a pitch of about 50 μm to about 300 μm.

The optical member may include one of polymethyl methacrylate (PMMA), polycarbonate (PC) and a combination including at least one of the foregoing. The lens-shaped portions and/or the prism-shaped portion may include ultraviolet-curable resin.

The prism-shaped portion may include a first inclined surface protruding from the surface of the optical member and a second inclined surface protruding from the surface of the optical member. The first inclined surface and the second inclined surface may form an internal angle of about 80 degrees to about 120 degrees. An edge defined by the first inclined surface and the second inclined surface may be rounded.

The optical member may have a first area corresponding to the lens-shaped portions and a second area corresponding to the at least one prism-shaped portion. The first area may be greater than or equal to the second area.

In another exemplary embodiment, a backlight assembly includes a light source and an optical member disposed over the light source. The optical member includes a first surface having a plurality of lens-shaped portions and at least one prism-shaped portion. A distance between the light source and the optical member may be in a range of about 4 mm to about 8 mm.

The optical member may further include a second surface disposed to face the light source.

In another exemplary embodiment, a liquid crystal display device includes a backlight assembly including a flat-type fluorescent lamp and an optical member disposed over the flat-type fluorescent lamp and a display unit configured to display an image using light provided from the backlight assembly. The optical member includes a surface having a plurality of lens-shaped portions and at least one prism-shaped portion.

A distance between the flat-type fluorescent lamp and the optical member may be in a range of about 4 mm to about 8 mm. A ratio of prism-shaped portion to the lens-shaped portions may be in a range of about 1:1 to about 1:9. The ratio of the prism-shaped portion to the lens-shaped portions may be in a range of about 1:1.5 to about 1:2.5.

In another exemplary embodiment, both the lens-shaped portions and the prism-shaped portion may be formed on a surface of the optical member to remove a dark line that is formed between adjacent discharge spaces, thereby improving luminance uniformity and reducing a thickness of the backlight assembly.

BRIEF DESCRIPTION OF THE DRAWINGS

The above and other features and advantage points of the present invention will become more apparent by describing in detailed example embodiments thereof with reference to the accompanying drawings, in which.

DETAILED DESCRIPTION OF THE INVENTION

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like reference numerals refer to similar or identical elements throughout.

It will be understood that when an element such as a layer, region or substrate is referred to as being "on," "coupled to" or "onto" another element, it may be directly on the other element or intervening elements may also be present. In contrast, when an element is referred to as being "directly on," "directly coupled to" or "directly onto" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of upper and lower. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

Figure 1:
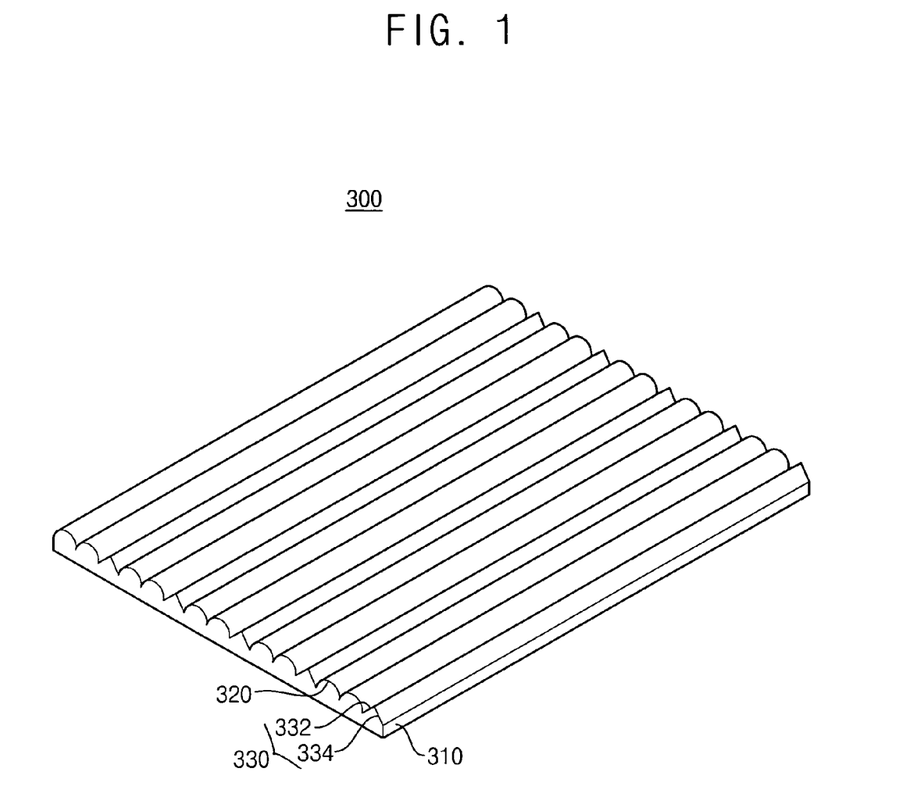
FIG. 1 is a perspective view illustrating an exemplary embodiment of an optical member according to the present invention.
Figure 2:
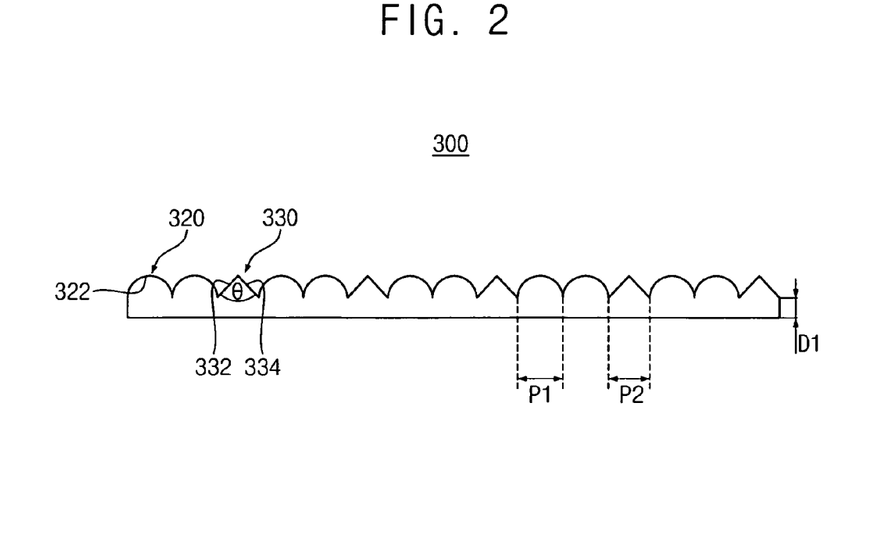
FIG. 2 is a cross-sectional view illustrating the optical member of in FIG. 1.

FIG. 1 is a perspective view illustrating an exemplary embodiment of an optical member according to an example embodiment of the present invention. FIG. 2 is a cross-sectional view illustrating the optical member illustrated in FIG. 1.

Referring to FIGS. 1 and 2, an optical member 300 includes a base plate 310, a plurality of first portions 320 formed on the base plate 310 and a plurality of second portions 330 formed on the base plate 310.

The base member 310 may have a substantially flat rectangular parallelepiped shape. The substantially planar base member 310 may be considered a base plate. In one exemplary embodiment, the base plate 310 includes a thickness D1 of about 1 millimeter (mm) to about 3 millimeters (mm).

The first portions 320 may be considered a lens-shaped portion 320 and including a substantially column shape having a curved surface. In one exemplary embodiment, the lens-shaped portion 320 includes a column shape having a curved upper surface.

In one embodiment, the upper surface of the lens-shaped portion 320 has a semi-circular shape. The curved upper surface may also be considered a convex surface on the column portion of the lens-shaped portion 320.

Light is incident onto a lower surface of the base plate 310. The lower surface may be considered a surface of the base plate 310 that is opposite the lens-shaped portion or facing a light source. Light traveling through the optical member is ultimately diffused through a curved surface 322 of lens-shaped portion 320. Since the curved surface 322 may be considered as having infinite flat surfaces, the light diffuses and advances along infinite optical paths.

In one exemplary embodiment, at least two lens-shaped portions 320 are arranged adjacent to each other to form a lens-shaped portion group. At least two lens-shaped portion groups are spaced apart from each other by a predetermined distance. The second portions 330, that may be considered prism-shaped portions 330, may be disposed between the adjacent lens-shaped portion groups. In alternative exemplary embodiments, at least two prism-shaped portions 330 may be arranged adjacent to each other to form a prism-shaped portion group. At least two prism-shaped portion groups are spaced apart from each other by a predetermined distance. The lens-shaped portion 320 or the lens-shaped portion group may be disposed between adjacent prism-shaped portion groups.

In exemplary embodiments, the prism-shaped portion 330 may have a substantially triangular shape. The prism-shaped portion 330 may include a first inclined surface 332 and a second inclined surface 334, which protrude from the base plate 310. In one exemplary embodiment, the first inclined surface 332 and the second inclined surface 334 may form an internal angle θ of about 80 degrees to 120 degrees.

In another exemplary embodiment, at least one prism-shaped portion 330 is disposed between the lens-shaped portions 320. Light is incident onto the lower surface of the base plate 310, and then diffuses and advances along two optical paths corresponding to the first inclined surface 332 and the second inclined surface 334, respectively.

In exemplary embodiments, light passing through the lens-shaped portion 320 and the prism-shaped portion 330 may diffuse in various directions and be superposed on each other. Advantageously, a uniform optical distribution may be formed.

In one exemplary embodiments, the optical member 300 may have a first area corresponding to the lens-shaped portions 320 and a second area corresponding to the at least one prism-shaped portion 330. The first area may be greater than or equal to the second area.

In exemplary embodiments, a number ratio of the prism-shaped portion 330 to the lens-shaped portion 320 may be in a range of about 1:1 to about 1:9. In other exemplary embodiment, the number ratio may be in a range of about 1:1.5 to about 1:2.5. In one exemplary embodiment, the number ratio between the prism-shaped portion 330 and the lens-shaped portion 320 is about 1:1.5. In another exemplary embodiment, the prism-shaped portion group may include two adjacent prism-shaped portions 330 and the lens-shaped portion group may include three adjacent lens-shaped portions 320. The prism-shaped portion group and the lens-shaped portion group may be alternately arranged.

In one exemplary embodiment, a first pitch P1 of the lens-shaped portion 320 and/or a second pitch P2 of the prism-shaped portion 330 may be in a range of about 50 micrometers (μm) to about 300 micrometers (μm).

Although two adjacent lens-shaped portions 320 and one prism-shaped portion 330 are alternately arranged in FIGS. 1 and 2, the number of the lens-shaped portions 320 and the number of the prism-shaped portions 330 are not limited to the above and may include any of a number of combination as is suitable for the purpose described herein.

In exemplary embodiments, the optical member 300 may include a transparent material so as to prevent optical loss. In one exemplary embodiment, the optical member 300 includes polycarbonate (PC), polyethylene terephthalate (PET), polymethyl methacrylate (PMMA), or any combination including at least one of the foregoing. In alternative exemplary embodiments, the lens-shaped portion 320 and/or the prism-shaped portion 330 may include ultraviolet-curable resin.

In other exemplary embodiments, the lens-shaped portion 320 and/or the prism-shaped portion 330 may have a refractive index equal to or greater than that of the base plate 310.

Figure 3:
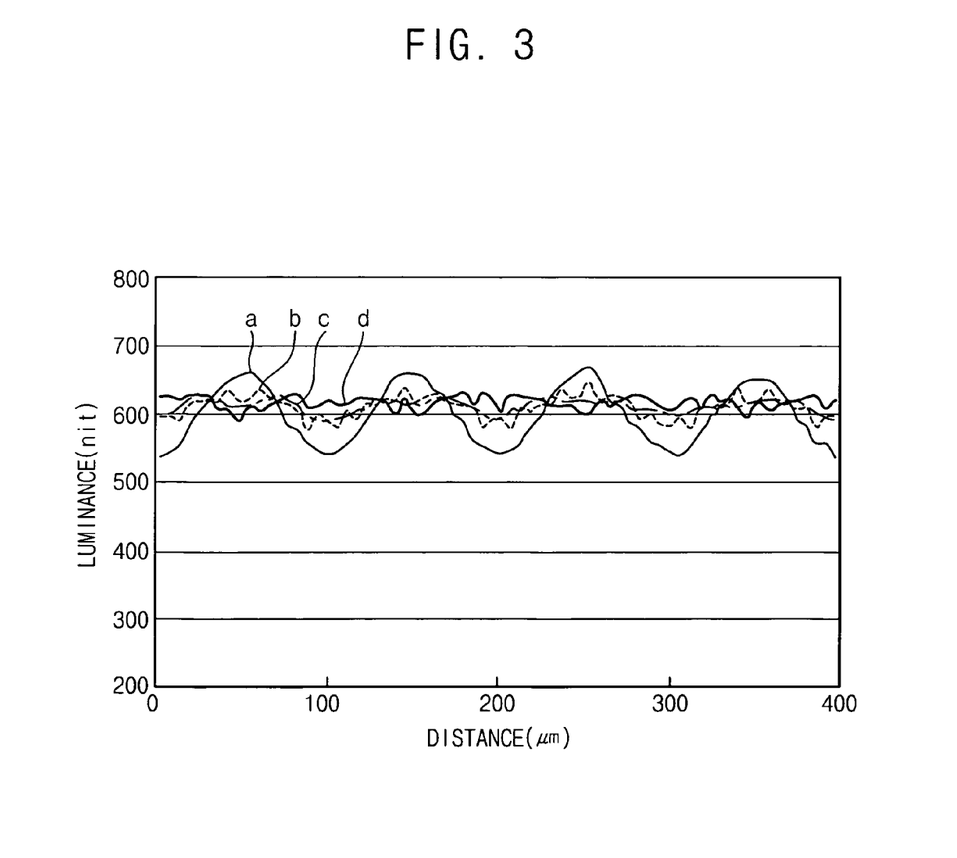
FIG. 3 is a graph showing luminance distributions of number ratios between the lens-shaped portion and the prism-shaped portion illustrated in FIGS. 1 and 2.

FIG. 3 is a graph showing luminance distributions of number ratios between the lens-shaped portion and the prism-shaped portion illustrated in FIGS. 1 and 2.

Referring to FIG. 3, in case 'd' where the number ratio between the prism-shaped portion 330 and the lens-shaped portion 320 is 1:2, the optical member 300 has the most uniform luminance distribution. Particularly, in case 'b' where the number ratio between the prism-shaped portion 330 and the lens-shaped portion 320 is 1:4, the optical member 300 has a more uniform luminance distribution than in case 'a' where the optical member 300 includes the lens-shaped portions 320 only. In case 'c' where the number ratio between the prism-shaped portion 330 and the lens-shaped portion 320 is 1:3, the optical member 300 has a more uniform luminance distribution than in case 'b' where the number ratio between the prism-shaped portion 330 and the lens-shaped portion 320 is 1:4. In case 'd' where the number ratio between the prism-shaped portion 330 and the lens-shaped portion 320 is 1:2, the optical member 300 has a more uniform luminance distribution than in case 'c' where the number ratio between the prism-shaped portion 330 and the lens-shaped portion 320 is 1:3.

In one exemplary embodiment, the optical member 300 may be formed to have the number ratio between the prism-shaped portion 330 and the lens-shaped portion 320 of 1:2.

Figure 4:
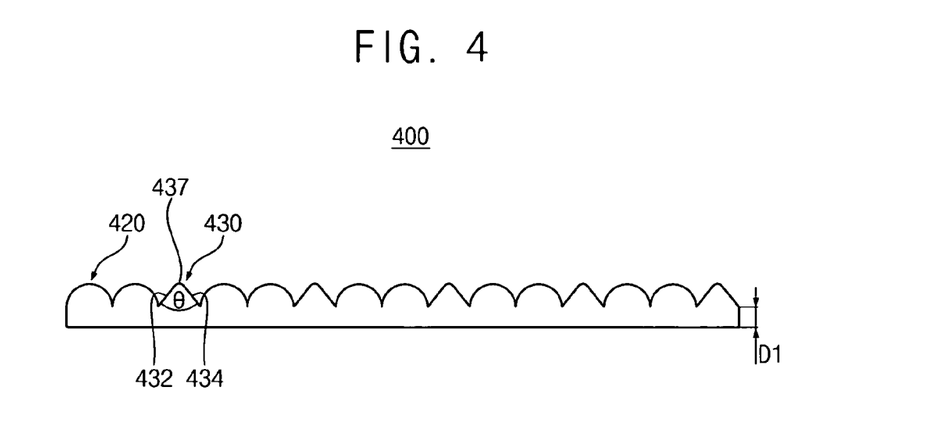
FIG. 4 is a cross-sectional view illustrating another exemplary embodiment of an optical member according to the present invention.

FIG. 4 is a cross-sectional view illustrating another exemplary embodiment of an optical member according to the present invention.

Referring to FIG. 4, an optical member 400 includes a base plate, a plurality of lens-shaped portions 420 formed on the base plate and a prism-shaped portion 430 formed on the base plate.

The prism-shaped portion 430 may have a substantially triangular shape. The prism-shaped portion 430 may include a first inclined surface 432 and a second inclined surface 434, which protrude from the base plate. In FIG. 4, the first inclined surface 432 and the second inclined surface 434 of the prism-shaped portion 430 define an edge 437, essentially connecting ends of the first inclined surface 432 and the second inclined surface 434 of the prism-shaped portion 430. In exemplary embodiments, the edge may be rounded. The optical member 400 illustrated in FIG. 4 is substantially the same as the optical member illustrated in FIGS. 1 and 2 except for the edge 437. Thus, any further descriptions for substantially the same elements will be omitted.

Figure 5:
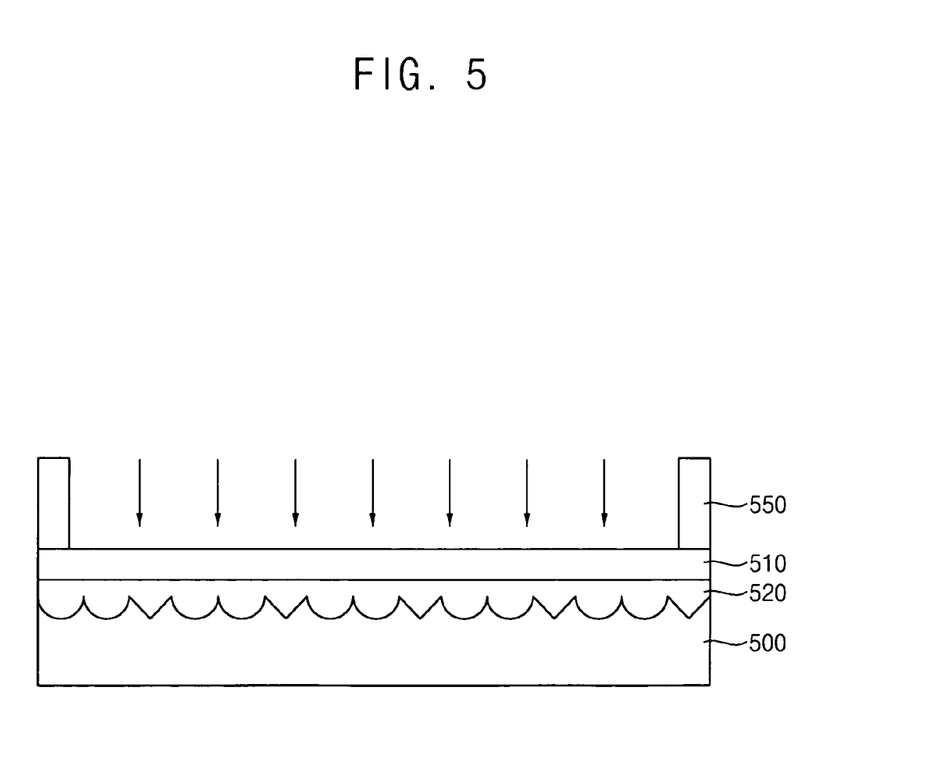
FIG. 5 is a cross-sectional view illustrating an exemplary embodiment of a method of forming an optical member according to the present invention.

FIG. 5 is a cross-sectional view illustrating an exemplary embodiment of a method of forming an optical member according to the present invention.

Referring to FIG. 5, a material layer 520 is disposed on a base 500. In one exemplary embodiment, the material layer 520 may include an ultraviolet-curable resin. In another exemplary embodiment, the base 500 may be considered a stamper. The stamper 500 may include grooves onto which the ultraviolet-curable resin 520 is placed. A base plate 510 is placed on the ultraviolet-curable resin 520. In one exemplary embodiment, the base plate 510 may include transparent plastics. In another exemplary embodiment, the stamper 500 may include, a metal. In another exemplary embodiment, the ultraviolet-curable resin 520 may have a refractive index equal to or greater than that of the base plate 510.

An edge region of the base plate 510 is pressurized. In one exemplary embodiment, the base plate 510 may be pressurized using a compression pole 550, such as illustrated by the arrows in FIG. 5. Ultraviolet (UV) light is irradiated onto the base plate 510 to ultimately attach the ultraviolet-curable resin 520 to a surface of the base plate 510. An optical member having a shape of the optical member 300 illustrated in FIG. 1 is formed. In exemplary embodiments, the lens-shaped portion and/or the prism-shaped portion may include the ultraviolet-curable resin 520.

Figure 6:
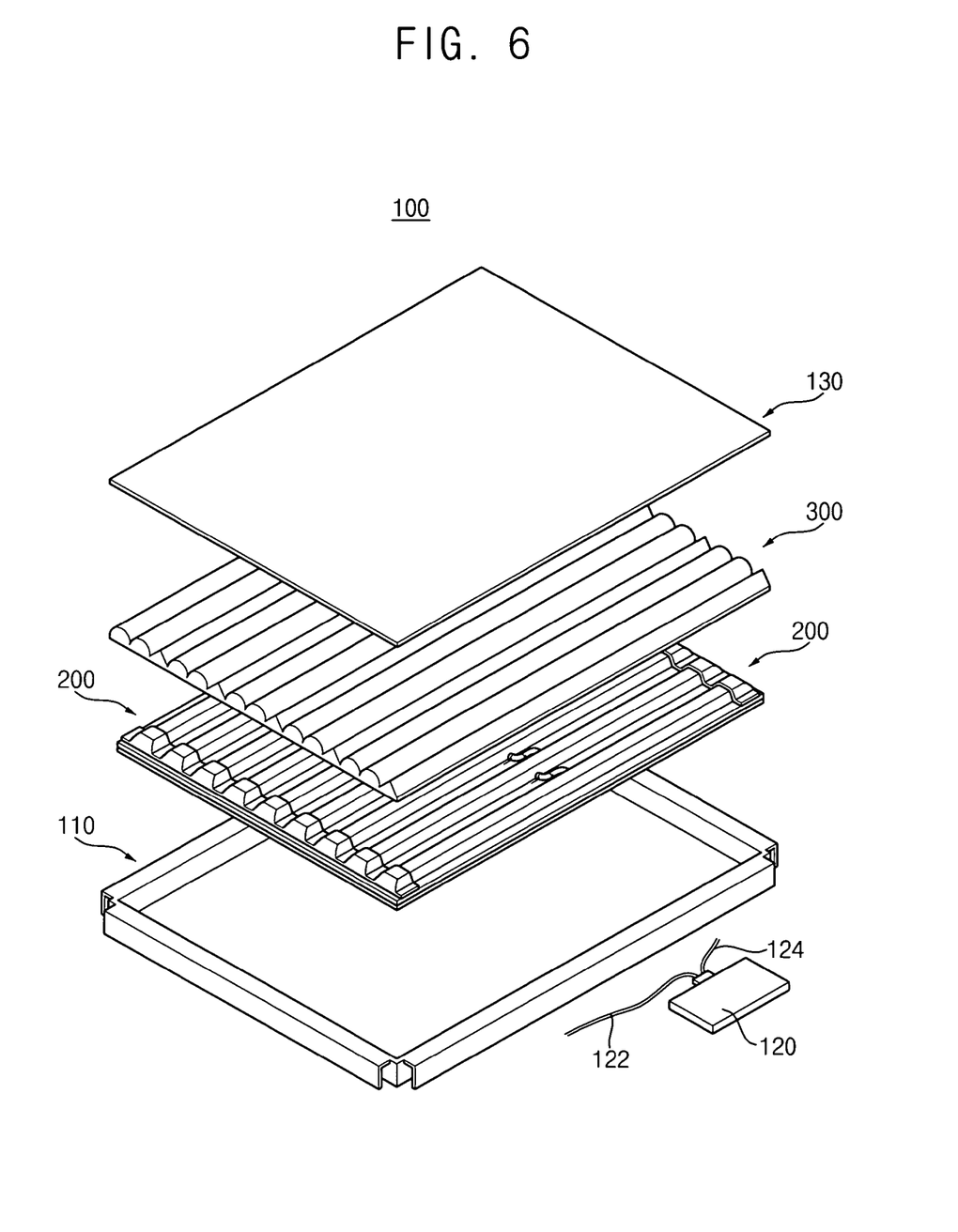
FIG. 6 is an exploded perspective view illustrating an exemplary embodiment of a backlight assembly according to the present invention.
Figure 7:
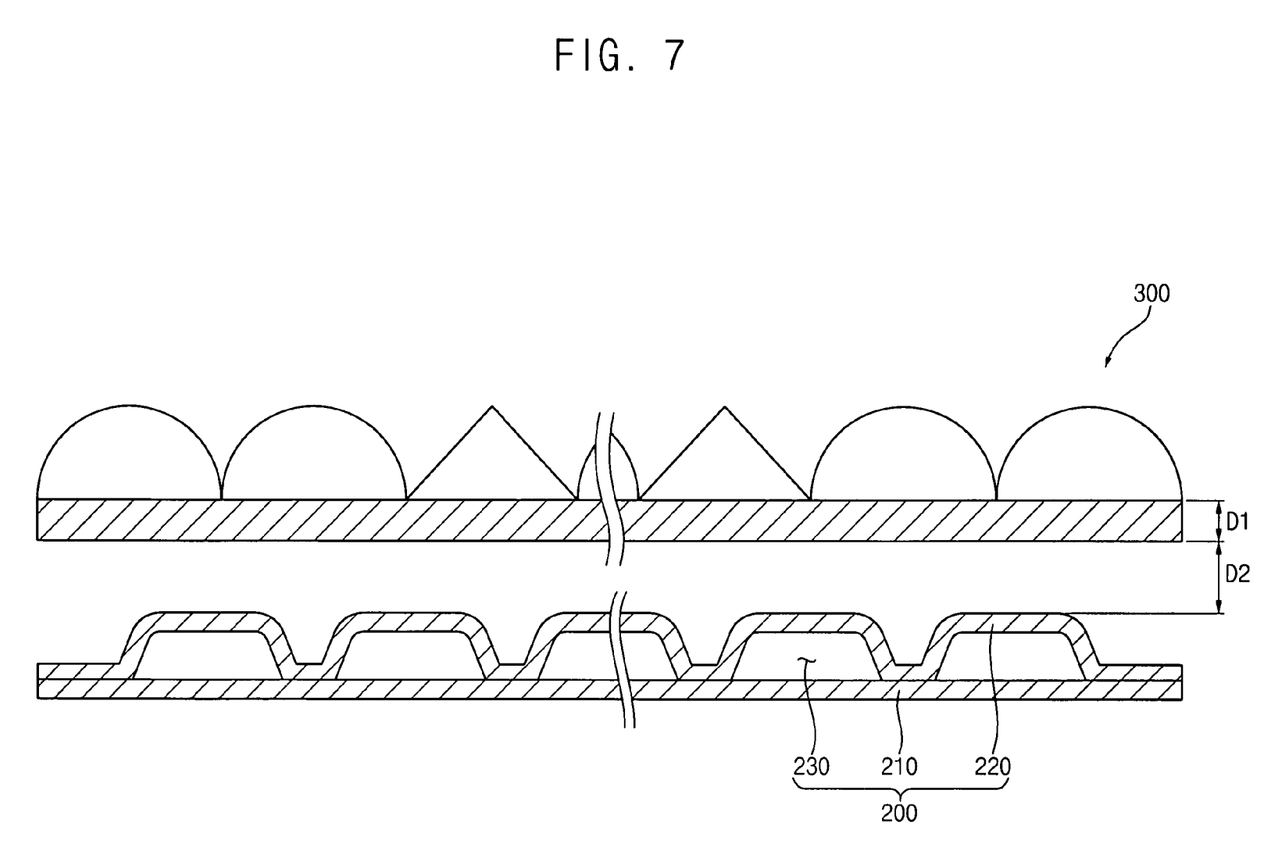
FIG. 7 is a cross-sectional view illustrating the flat-type fluorescent lamp and the light-diffusing plate illustrated in FIG. 6.

FIG. 6 is an exploded perspective view illustrating an exemplary embodiment of a backlight assembly according to the present invention. FIG. 7 is a cross-sectional view illustrating the flat-type fluorescent lamp and the light-diffusing plate illustrated in FIG. 6.

Referring to FIGS. 1, 6 and 7, a backlight assembly 100 includes a receiving container 110, a light source 200, an optical member 300 and an inverter 120. The light source 200 may include a flat-type fluorescent lamp.

The flat-type fluorescent lamp 200 is received in the receiving container 110. The flat-type fluorescent lamp 200 is divided into a plurality of discharge spaces 230 for emitting light. In order to emit the light as a planar light, the flat-type fluorescent lamp 200 viewed from a plan view has a substantially rectangular shape. The flat-type fluorescent lamp 200 includes a plasma discharge in the discharge spaces 230 in response to a discharge voltage provided from the inverter 120. The flat-type fluorescent lamp 200 converts ultraviolet light generated due to the plasma discharge into visible light and emits the visible light through an upper surface of the flat-type fluorescent lamp 200. The flat-type fluorescent lamp 200 has a relatively wide light-emitting area, and is divided into the discharge spaces 230 such that the flat-type fluorescent lamp 200 may improve light-emitting efficiency and emit uniform light. The flat-type fluorescent lamp 200 includes a first substrate 210 and a second substrate 220 coupled to the first substrate 210 to form the discharge spaces 230.

In FIGS. 6 and 7, the flat-type fluorescent lamp 200 serves as a light source. In alternative exemplary embodiments, an external electrode fluorescent lamp (EEFL), a cold cathode fluorescent lamp (CCFL), a light emitting diode (LED), etc. may serve as a light source.

The optical member 300 is disposed over the flat-type fluorescent lamp 200 to remove a dark line and improve light efficiency. The optical member 300 includes a base plate 310, a lens-shaped portion 320 formed on base plate 310 and a prism-shaped portion 330 formed on base plate 310.

Referring to FIG. 7, the optical member 300 is spaced apart from a surface of the flat-type fluorescent lamp 200 by a predetermined distance. In exemplary embodiments, a distance D2 between the optical member 300 and the flat-type fluorescent lamp 200 may vary in accordance with a size of the lens-shaped portion 320 and/or a size of the prism-shaped portion 330. In one exemplary embodiment, the distance D2 is no more than about 10 mm. In another exemplary embodiment, the optical member 300 is spaced apart from the flat-type fluorescent lamp 200 by the distance D2 of about 4 mm to about 8 mm. When the distance D2 between the optical member 300 and the flat-type fluorescent lamp 200 decreases, a thickness of the backlight assembly 100 may be greatly reduced. In FIG. 7, the distance D2 between the optical member 300 and the flat-type fluorescent lamp 200 is greater than a thickness D1 of the base plate 310. In alternative exemplary embodiments, the distance D2 between the optical member 300 and the flat-type fluorescent lamp 200 may be less than the thickness D1 of the base plate 310.

In exemplary embodiments, the optical member 300 may include a transparent material so as to prevent optical loss. In one exemplary embodiment, the optical member 300 includes polycarbonate (PC), polyethylene terephthalate (PET), or any material suitable for the purpose described herein. In alternative exemplary embodiments, the lens-shaped portion 320 and/or the prism-shaped portion 330 may include ultraviolet-curable resin.

In exemplary embodiments, the optical member 300 including the lens-shaped portion 320 and the prism-shaped portion 330 may be formed using various methods, such as stamping, extrusion molding, injection molding, or any method suitable for the purpose described herein.

The inverter 120 generates the discharge voltage for the flat-type fluorescent lamp 200. The inverter 120 boosts an alternating current voltage at a low voltage level to output an alternating current voltage at a high voltage level as the discharge voltage. Thus, the discharge voltage generated from the inverter 120 is applied to the flat-type fluorescent lamp 200 through a first power line 122 and a second power line 124.

The backlight assembly 100 may further include an optical sheet 130 over the optical member 300 to improve luminance characteristics. The optical sheet 130 may include, but is not limited to, a light-diffusing sheet, a prism sheet, and any combination including at least one of the foregoing.

Figure 8:
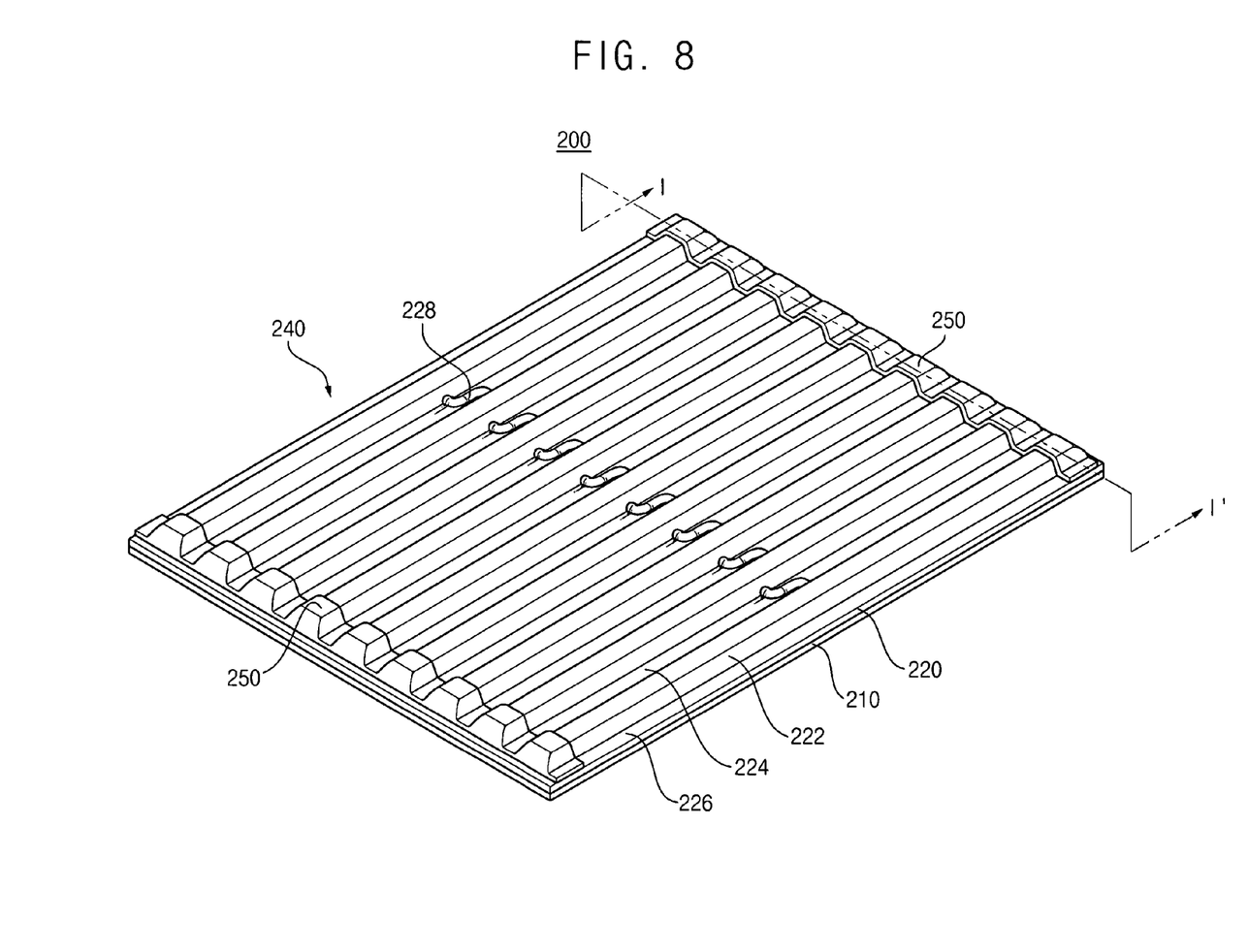
FIG. 8 is a perspective view illustrating the flat-type fluorescent lamp illustrated in FIG. 6.
Figure 9:
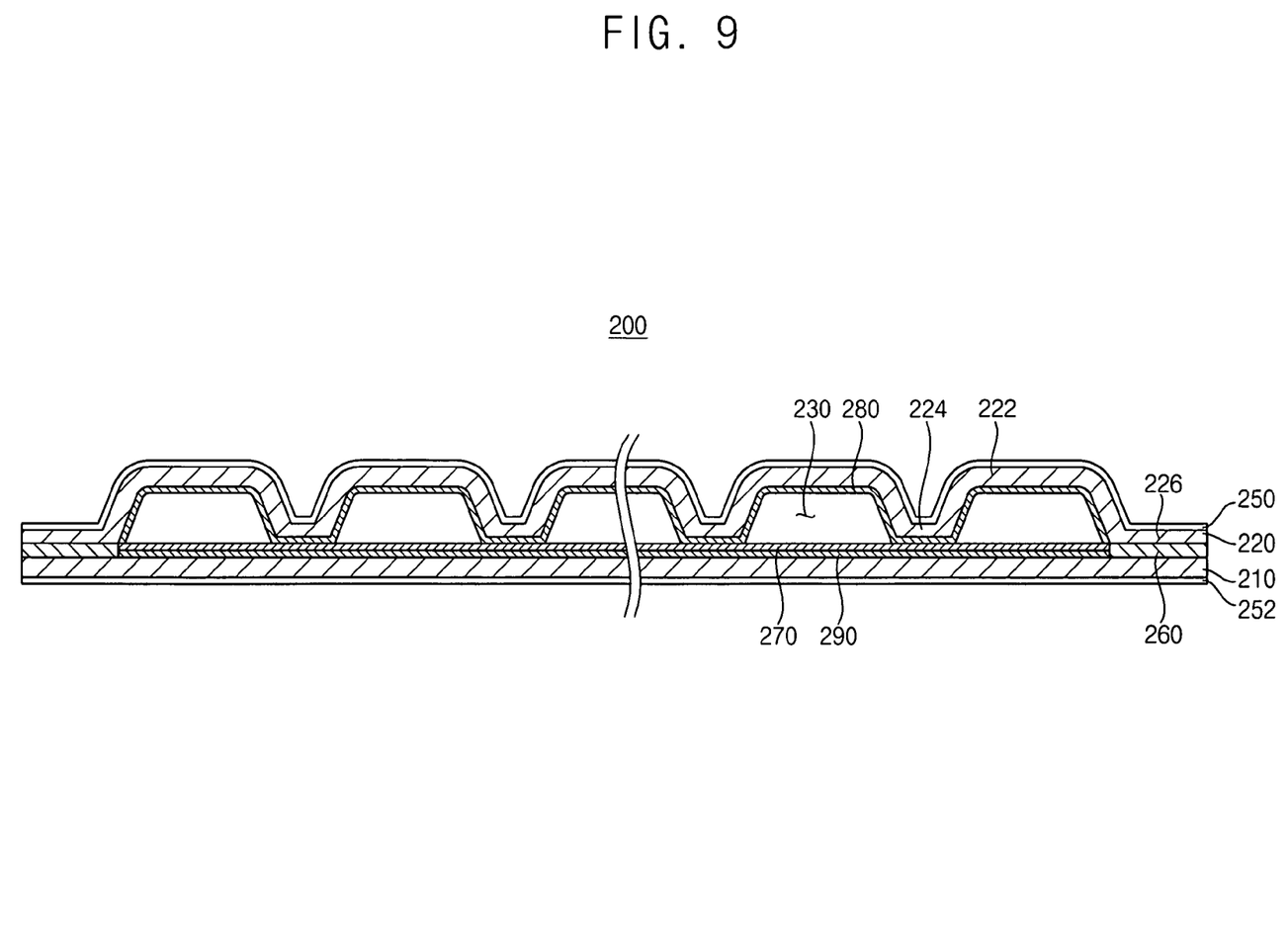
FIG. 9 is a cross-sectional view taken along line I-I' in FIG. 8.

FIG. 8 is a perspective view illustrating the flat-type fluorescent lamp illustrated in FIG. 6. FIG. 9 is a cross-sectional view taken along line I-I' in FIG. 8.

Referring to FIGS. 8 and 9, the flat-type fluorescent lamp 200 includes a lamp body 240 divided into the discharge spaces 230 spaced apart from each other and electrodes 250 disposed at end portions of the lamp body 240 to cross the discharge space 230 in a direction substantially perpendicular to the discharge spaces 230.

The lamp body 240 includes the first substrate 210 and the second substrate 220 coupled to the first substrate 210 to form the discharge spaces 230.

The first substrate 210 has a substantially rectangular plate-like shape. In exemplary embodiments, the first substrate 210 may include glass. The first substrate 210 may further include a material blocking the ultraviolet light such that ultraviolet light generated in the discharge spaces 230 that may leak out is reduced.

In exemplary embodiments, the second substrate 220 may be shaped in a molding process when forming the discharge spaces 230. In other exemplary embodiments, the second substrate 220 may include a transparent material through which the visible light generated in the discharge spaces 230 is transmitted. In one exemplary embodiment, the second substrate 220 may include glass. The second substrate 220 may further include a material blocking the ultraviolet light such that ultraviolet light generated in the discharge spaces 230 that may leak out is reduced.

The second substrate 220 may be formed in various methods. In one exemplary embodiment, a glass substrate having substantially the same shape as the first substrate 210 is heated at a predetermined temperature and molded through a mold to form the second substrate 220. In another exemplary embodiment, the second substrate 220 may be formed in such a manner that the glass substrate is heated and an air is injected into the heated glass substrate.

Referring to FIG. 8, the second substrate 220 includes a plurality of discharge space portions 222, a plurality of space-dividing portions 224 and a sealing portion 226 to define the discharge spaces 230. The discharge space portions 222 may be substantially "U"-shaped with an open part of the "U" facing the first substrate 210. In an assembled condition of the lamp body 240, the discharge space portions 222 are spaced apart from the first substrate 210 to provide a space between first substrate 210 and the second substrate 220 considered as the discharge spaces 230.

The space-dividing portions 224 are disposed between adjacent discharge space portions 222 and make contact with the first substrate 210 further dividing a space between the first and second substrates 210 and 220 and defining the discharge spaces 230. The sealing portion 226 is formed along an edge portion of the second substrate 220 and coupled to the first substrate 210. In exemplary embodiments, the second substrate 220 may have a cross-sectional profile having a plurality of half-arches arranged consecutively as shown in FIG. 9. In alternative exemplary embodiment, the second substrate 220 may include any of a number of shapes or cross-sectional profiles of the discharge space portions 222, including but not limited to, a semicircle, a square, a trapezoid, or any profile that is suitable for the purpose described herein.

Referring to FIG. 8, the second substrate 220 has a connection path 228 to connect adjacent discharge spaces 230 to each other. Each of the discharge spaces 230 is connected to adjacent discharge spaces 230 by one connection path 228. In alternative exemplary embodiments, more than one connection path 228 may be used to connect adjacent discharge spaces 230. When air in the discharge spaces 230 is vented, or a discharge gas is injected into the discharge spaces 230, the air or the discharge gas may be flowed to another discharge space 230 through the connection path 228. In exemplary embodiments, the connection path 228 may be formed at essentially the same time or simultaneously when the second substrate 220 is formed, such as through the molding process.

The connection path 228 may have various shapes. In one exemplary embodiment, the connection path 228 may substantially have an "S" shape. Advantageously, when the connection path 228 has the "S" shape, channeling phenomena due to interference between the discharge spaces 230 may be reduced or effectively prevented since a flowing path through which the discharge gas flows is lengthened.

The second substrate 220 is coupled to the first substrate 210 by means of a sealing member 260. The sealing member may include an adhesive or other material suitable for securing the first and second substrates 210 and 220 to each other.

In one exemplary embodiment, frit having a melting point lower than that of the first and second substrates 210 and 220 may serve as the sealing member 260. The frit may include glass and/or metal. The frit is disposed between the first and second substrates 210 and 220 corresponding to the sealing portion 226. The frit disposed between the first and second substrates 210 and 220 is melted by externally applied heat to combine the first substrate 210 with the second substrate 220. The combination between the first and second substrates 210 and 220 may be performed under a temperature from about 400 degrees to about 600 degrees Celsius.

In exemplary embodiments, the space-dividing portions 224 of the second substrate 220 are cohered to the first substrate 210 due to a pressure difference between an inner space and an outer space of the lamp body 240. When the first and second substrates 210 and 220 are coupled to each other and the air in the discharge spaces 230 is vented, the discharge spaces 230 of the lamp body 240 maintain inner spaces of the discharge spaces 230 in a vacuum state. Various discharge gases may be injected into the discharge spaces 230 for the plasma discharge. The discharge gas may include, but is not limited to, mercury (Hg), neon (Ne), argon (Ar), and any other material suitable for the purpose described herein.

In one exemplary embodiment, a gas pressure of the discharge spaces 230 is maintained in a range of about 50 Torr to about 70 Torr lower than an atmospheric pressure of about 760 Torr. Due to a pressure difference between the gas pressure of the discharge spaces 230 and the atmospheric pressure at areas external to the discharge spaces 230, force is applied to the lamp body 240 in a direction toward the discharge spaces 230, such that the space-dividing portions 224 may be cohered to the first substrate 210.

Referring to FIG. 9, the lamp body 240 further includes a first fluorescent layer 270 and a second fluorescent layer 280. The first and second fluorescent layers 270 and 280 are formed on the first and second substrates 210 and 220 such that the first and second fluorescent layers 270 and 280 face each other. The first and second fluorescent layers 270 and 280 are excited by the ultraviolet light that is caused by the plasma discharge in the discharge spaces 230 to emit the visible light.

The lamp body 240 further includes a reflecting layer 290 formed between the first substrate 210 and the first fluorescent layer 270. The reflecting layer 290 reflects the visible light emitted from the first and second fluorescent layers 270 and 280, thereby preventing the leakage of the visible light through the first substrate 210. In one exemplary embodiment, in order to enhance reflectivity and reduce variation of color coordinates, the reflecting layer 290 may include a metal oxide such as aluminum oxide ($Al_2O_3$), barium sulfate ($BaSO_4$), or other material suitable for the purpose described herein.

In exemplary embodiments, the first fluorescent layer 270, the second fluorescent layer 280 and/or the reflecting layer 290 may be applied, such as by spraying, onto the first and second substrates 210 and 220 before coupling the first substrate 210 to the second substrate 220. The first fluorescent layer 270, the second fluorescent layer 280 and the reflecting layer 290 are formed over the interior surfaces of the first and second substrates 210 and 220 except for an area on which the sealing portion 226 is formed. After the first and second substrates 210 and 220 are coupled to each other, the first and second fluorescent layers 270 and 280 may contact each other in an area proximate to the space-dividing portions 224. In alternative exemplary embodiments, the first fluorescent layer 270, the second fluorescent layer 280 and the reflecting layer 290 may not be formed on areas corresponding to the space-dividing portions 224.

The lamp body 240 may further include a protective layer (not shown) formed between the second substrate 220 and the second fluorescent layer 280 and/or between the first substrate 210 and the reflecting layer 290. The protective layer blocks a chemical reaction between the first and second substrates 210 and 220 and the discharge gas, such as the mercury (Hg), thereby preventing loss of the mercury and blackening of the lamp body 240.

The electrode 250 is formed on both ends of the lamp body 240 to cross each of the discharge spaces 230 in a direction substantially perpendicular to the discharge spaces 230. Referring to FIG. 9, the electrode 250 is formed on an upper surface of the lamp body 240, that may also be considered an outer surface of the second substrate 220. An auxiliary electrode 252 may be formed on a lower surface the lamp body 240, that may also be considered an outer surface of the first substrate 210. When the electrode 250 and the auxiliary electrode 252 are formed on the lower surface and the upper surface of the lamp body 240, the electrode 250 and the auxiliary electrode 252 may be electrically connected to each other by means of a connecting member such as a conductive clip (not shown). In alternative exemplary embodiments, the electrode 250 may be formed at an area inside the lamp body 240.

In exemplary embodiments, the electrode 250 may include a conductive material so as to apply the discharge voltage from the inverter 120 illustrated in FIG. 6 to the lamp body 240. In one exemplary embodiment, the electrode 250 may include a coating including, but not limited to, a silver paste having silver (Ag) and/or silicon oxide ($SiO_2$). In alternative exemplary embodiments, the electrode 250 may be formed using a spray coating method of a metal powder having metal or metal composition. An insulating layer (not shown) may be further formed on outer surfaces of the electrode 250 so as to protect the electrode 250.

Figure 10:
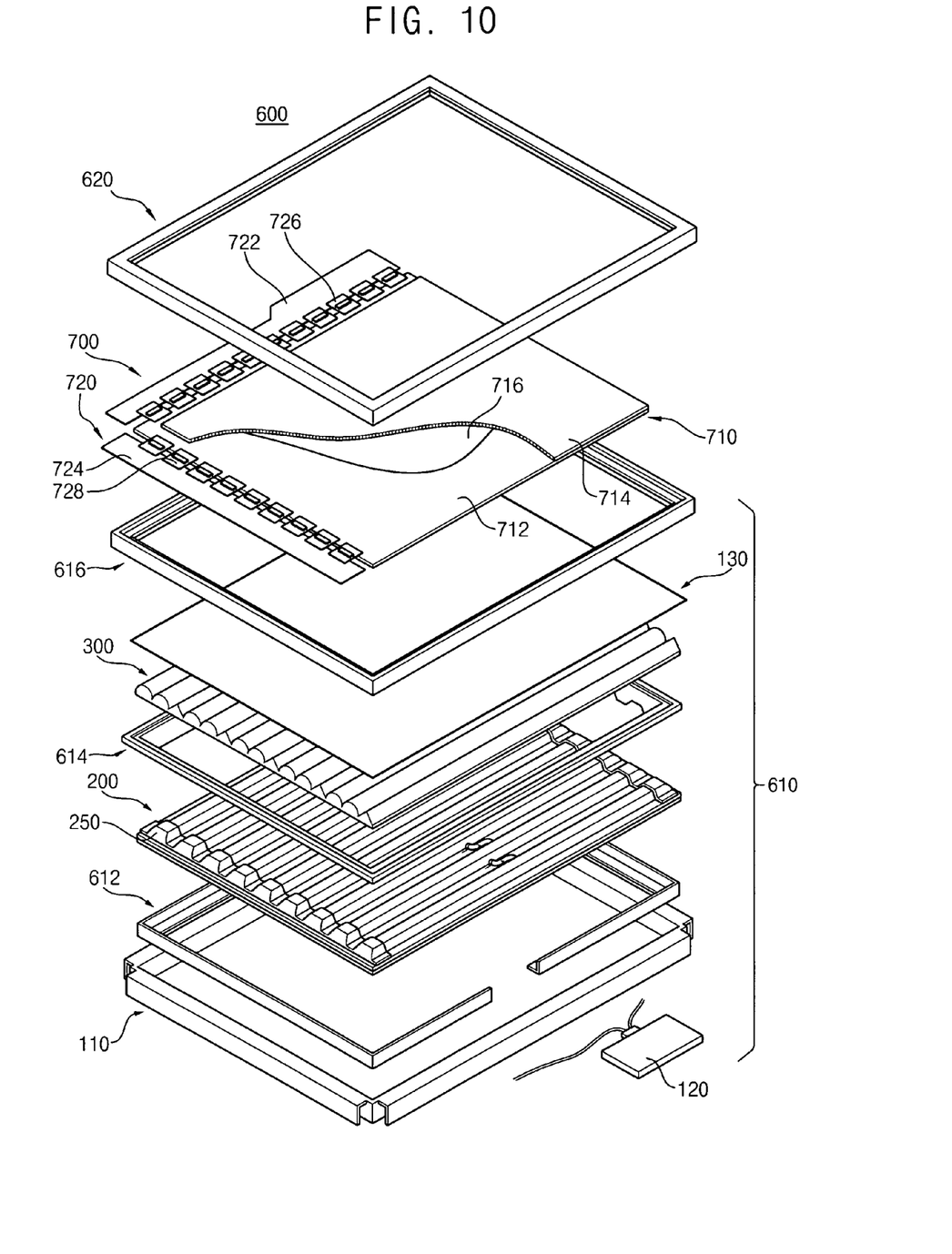
FIG. 10 is an exploded perspective view illustrating an exemplary embodiment of a liquid crystal display device according to the present invention.

FIG. 10 is an exploded perspective view illustrating an exemplary embodiment of a liquid crystal display device according to the present invention.

Referring to FIG. 10, a liquid crystal display (LCD) device 600 includes a backlight assembly 610 and a display unit 700.

In FIG. 10, the backlight assembly 610 includes the receiving container 110, the flat-type fluorescent lamp 200, the optical member 300, the inverter 120 and the optical sheet 130, which are shown in FIGS. 6 though 9. In alternative exemplary embodiments, the backlight assembly 610 may include the optical member 400 illustrate in FIG. 4. Thus, any further descriptions for substantially the same elements will be omitted.

The backlight assembly 610 may further include a buffer member 612 disposed between the receiving container 110 and the flat-type fluorescent lamp 200 to support the flat-type fluorescent lamp 200. The buffer member 612 is disposed on an edge portion of the flat-type fluorescent lamp 200. The buffer member 612 isolates and separates the flat-type fluorescent lamp 200 from the receiving container 110 by a predetermined distance such that the flat-type fluorescent lamp 200 is not electrically connected to the receiving container 110.

In one exemplary embodiment, in order to electrically insulate the flat-type fluorescent lamp 200 from the receiving container 110, the buffer member 612 may include an insulating material. In another exemplary embodiment, the buffer member 612 may include an elastic material such as silicon so as to absorb an impact externally applied to the flat-type fluorescent lamp 200. The buffer member 612 may include, but is not limited to, silicon. In another exemplary embodiment, the buffer member 612 may include two pieces having a substantially "U" shape. In alternative exemplary embodiments, the buffer member 612 may include four pieces corresponding to sides or corners of the flat-type fluorescent lamp 200, respectively. The four pieces of the buffer member 612 may be integrally formed into one frame.

The backlight assembly 610 may further include a first mold 614 disposed between the flat-type fluorescent lamp 200 and the optical member 300. The first mold 614 fixes an edge portion of the flat-type fluorescent lamp 200 and supports edge portions of the optical member 300 and the optical sheet 130, such as a light diffusing plate. As shown in FIG. 10, the first mold 614 may be a frame that is integrally formed into one piece. In alternative exemplary embodiments, the first mold 614 may include two pieces having a substantially "U" or "L" shape, or four pieces substantially corresponding to four sides of the flat-type fluorescent lamp 200.

The backlight assembly 610 may further include a second mold 616 disposed between the light-diffusing plate 130 and the display unit 700. The second mold 616 fixes edge portions of the optical member 300 and the light-diffusing plate 130, and supports an edge portion of an LCD panel 710 of the display unit 700. Similar to the first mold 614, the second mold 616 may be a frame that is integrally formed into one piece, or may have a divided structure including two pieces or four pieces.

The display unit 700 includes the LCD panel 710 that displays images using light from the backlight assembly 610 and a driving circuit 720 that drives the LCD panel 710.

The LCD panel 710 includes a first substrate 712, a second substrate 714 facing the first substrate 712, and a liquid crystal layer 716 disposed between the first and second substrates 712 and 714.

In exemplary embodiments, the first substrate 712 is a TFT substrate on which TFTs (not shown) are formed substantially in a matrix configuration. In one exemplary embodiment, the first substrate 712 includes glass. Each of the TFTs may have a source terminal connected to a data line (not shown), a gate terminal connected to a gate line (not shown) and a drain terminal connected to a pixel electrode (not shown) which may include a transparent conductive material.

In exemplary embodiments, the second substrate 714 may be a color filter substrate on which pixels may be formed in a thin film form. The pixels may include, but are not limited to, red, green and blue (RGB) pixels. In one exemplary embodiment, the second substrate 714 may include glass. A common electrode (not shown) may be formed on the second substrate 714. On another exemplary embodiment, the common electrode may include a transparent conductive material.

When power is applied to the gate terminal of the TFT and the TFT is turned on, an electric field is generated between the pixel electrode and the common electrode. The electric field varies an aligning angle of the liquid crystal molecules in the liquid crystal layer 716 disposed between the first substrate 712 and the second substrate 714. Optical transmissivity of the liquid crystal layer 716 is varied in accordance with the variation of the aligning angle of the liquid crystal molecules, so desired images may be obtained.

Referring again to FIG. 10, the driving circuit 720 includes a data printed circuit board (PCB) 722 that applies a data driving signal to the LCD panel 710, a gate PCB 724 that applies a gate driving signal to the LCD panel 710, a data flexible printed circuit (FPC) film 726 that electrically connects the data PCB 722 to the LCD panel 710 and a gate flexible printed circuit film 728 that electrically connects the gate PCB 724 to the LCD panel 710. In one exemplary embodiment, the data and gate flexible printed circuit films 726 and 728 include a tape carrier package (TCP) and/or a chip-on-film (COF). In alternative exemplary embodiments, separated signal lines may be formed on the LCD panel 710 and the gate flexible printed circuit film 728 to allow the gate PCB 724 to be omitted.

The LCD device 600 may further include a top chassis 620 so as to fix the display unit 700. The top chassis 620 is coupled to the receiving container 110 to fix the edge portion of the LCD panel 710 to the receiving container 110. The data PCB 722 may be bent via the data flexible printed circuit film 726 such that the data PCB 722 is fixed to a side portion and/or a rear portion of the receiving container 110. In one exemplary embodiment, the top chassis 620 may include, but is not limited to, metal having a superior strength and a low deformation to protect and support the LCD device 600 elements.

In an exemplary embodiment of the optical member according to the present invention, the optical member includes a prism shape portion and a lens shape portion. The optical member is employed in the backlight assembly and the LCD device includes the backlight assembly, thereby improving luminance uniformity of the backlight assembly.

In another exemplary embodiment, a distance between the optical member and the flat-type fluorescent lamp is reduced, such that the backlight assembly may have an overall reduced thickness.

Although example embodiments of the present invention have been described, it is understood that the present invention should not be limited to these example embodiments but various changes and modifications can be made by one ordinary skilled in the art within the spirit and scope of the present invention as hereinafter claimed.

What is claimed is:

1. An optical member comprising a surface including
   a first group including a plurality of consecutively disposed lens-shaped portions, the lens-shaped portions diffusing light incident to the optical member directly from a light source, the diffused light of the lens-shaped portions traveling through the lens-shaped portions and away from the optical member, each lens-shaped portion comprising a column shape including a semi-circular curved upper surface; and
   a second group including at least one prism-shaped portion diffusing the light incident to the optical member directly from the light source, the diffused light of the prism-shaped portion traveling through the prism-shaped portion and away from the optical member,
   wherein the first group and the second group are alternately disposed on the surface, and
   wherein a number ratio of the prism-shaped portion and the lens-shaped portions is 1:2, and the prism-shaped portion and the lens-shaped portions have a substantially same height.

2. The optical member of claim 1, wherein each of the lens-shaped portions has a pitch of about 50 micrometers (μm) to about 300 micrometers (μm).

3. The optical member of claim 1, wherein the prism-shaped portion has a pitch of about 50 (μm) to about 300 (μm).

4. The optical member of claim 1, wherein the optical member includes one of polymethyl methacrylate (PMMA), polycarbonate (PC) and a combination including at least one of the foregoing.

5. The optical member of claim 1, wherein the lens-shaped portions and/or the prism-shaped portion includes ultraviolet-curable resin.

6. The optical member of claim 1, wherein the prism-shaped portion comprises:
   a first inclined surface protruding from the surface of the optical member; and
   a second inclined surface protruding from the surface of the optical member, the first inclined surface and the second inclined surface forming an internal angle of about 80 degrees to about 120 degrees.

7. The optical member of claim 6, wherein the first inclined surface and the second inclined surface forms an edge that is rounded.

8. The optical member of claim 1, wherein the optical member has a first area corresponding to the lens-shaped portions and a second area corresponding to the at least one prism-shaped portion, the first area being greater than or equal to the second area.

9. The optical member of claim 1, wherein the first group and the second group are respectively disposed directly adjacent to each other.

10. A backlight assembly comprising:
    a light source; and
    an optical member disposed over the light source and comprising a first surface including:
       a plurality of lens-shaped portions disposed directly adjacent to each other, each of the lens-shaped portions comprising a column shape including a semi-circular curved upper surface and diffusing a first portion of light incident to the optical member from the light source, the diffused light of the lens-shaped portions traveling through the lens-shaped portions and away from the backlight assembly; and
       at least one prism-shaped portion diffusing a second portion of the light incident to the optical member from the light source, the diffused light of the prism-shaped portion traveling through the prism-shaped portion and away from the backlight assembly,
    wherein the plurality of directly adjacent lens-shaped portions and the at least one prism-shaped portion are alternately arranged on the first surface, and
    wherein a number ratio of the prism-shaped portion and the lens-shaped portions is 1:2, and the prism-shaped portion and the lens-shaped portions have a substantially same height.

11. The backlight assembly of claim 10, wherein a distance between the light source and the optical member is in a range of about 4 mm to about 8 mm.

12. The backlight assembly of claim 10, wherein the optical member further comprises a second surface facing the light source.

13. The backlight assembly of claim 10, wherein the light source comprises a flat-type fluorescent lamp.

14. The backlight assembly of claim 13, wherein the flat-type fluorescent lamp comprises:
    a lamp body comprising a plurality of discharge spaces; and
    an electrode disposed on ends of the lamp body.

15. The backlight assembly of claim 14, the lamp body further comprising a first substrate and a second substrate coupled to the first substrate, wherein the first substrate and the second substrate define the discharge spaces.

16. The backlight assembly of claim 15, the lamp body further comprising a first fluorescent layer and a second fluorescent layer disposed on the first substrate and the second substrate, respectively, wherein the first fluorescent layer and the second fluorescent layer are opposite each other.

17. The backlight assembly of claim 10, wherein the optical member has a first area corresponding to the lens-shaped portions and a second area corresponding to the at least one prism-shaped portion, the first area being greater than or equal to the second area.

18. A liquid crystal display (LCD) device comprising:
- a backlight assembly comprising a flat-type fluorescent lamp and an optical member disposed over the flat-type fluorescent lamp, the optical member comprising:
  - a surface having a plurality of consecutively disposed lens-shaped portions on the surface and diffusing light incident to the optical member from the flat-type fluorescent lamp, the diffused light of the lens-shaped portions traveling through the lens-shaped portions and away from the backlight assembly, each of the lens-shaped portions comprising a column shape including a semi-circular curved upper surface, and
  - at least one prism-shaped portion diffusing the light incident to the optical member from the flat-type fluorescent lamp, the diffused light of the prism-shaped portion traveling through the prism-shaped portion and away from the backlight assembly, the consecutive lens-shaped portions disposed between adjacent prism-shaped portions,
  - wherein a number ratio of the prism-shaped portion and the lens-shaped portions is 1:2, and the prism-shaped portion and the lens-shaped portions have a substantially same height; and
- a display unit configured to display images using light provided from the backlight assembly.

19. The LCD device of claim 18, wherein a distance between the flat-type fluorescent lamp and the optical member is in a range of about 4 mm to about 8 mm.

20. The LCD device of claim 18, wherein the optical member includes one of polymethyl methacrylate (PMMA), polycarbonate (PC) and a combination including at least one of the foregoing.

21. The LCD device of claim 18, wherein at least one of the lens-shaped portions and the prism-shaped portion includes ultraviolet-curable resin.

22. The LCD device of claim 18, wherein the optical member has a first area corresponding to the lens-shaped portions and a second area corresponding to the at least one prism-shaped portion, the first area being greater than or equal to the second area.

23. A method of forming an optical member, the method comprising:
- disposing an ultraviolet-curable resin on a surface of a base, the base comprising profiles corresponding to a plurality of lens-shaped portions and a prism-shaped portion of the optical member,
- disposing a base plate on the resin,
- processing the resin and the base plate to form the optical member comprising the plurality of lens-shaped portions and the prism-shaped portion, the processing comprising irradiating ultraviolet light onto the base plate,
- wherein the profiles comprise:
  - a first profile including a plurality of consecutively disposed lens-shaped portions diffusing light incident to the optical member from a light source, the diffused light of the lens-shaped portions traveling through the lens-shaped portions and away from the optical member, each of the lens-shaped portions comprising a column shape including a semi-circular curved upper surface, and
  - a second profile including the prism-shaped portion diffusing the light incident to the optical member from the light source, the diffused light of the prism-shaped portion traveling through the prism-shaped portion and away from the optical member, the first and second profiles disposed alternating with each other across the surface of the base,
- wherein a number ratio of the prism-shaped portion and the lens-shaped portions is 1:2, and the prism-shaped portion and the lens-shaped portions have a substantially same height.

\* \* \* \* \*